United States Patent
Otsuka et al.

[11] Patent Number: 5,985,204
[45] Date of Patent: Nov. 16, 1999

[54] METHOD FOR PRODUCING LAMINATED OBJECT

[75] Inventors: Yukio Otsuka, Aichi-ken; Motoaki Ozaki, Okazaki, both of Japan

[73] Assignee: Toyota Jidosha Kabushiki Kasiha, Japan

[21] Appl. No.: 09/065,627

[22] Filed: Apr. 24, 1998

[30] Foreign Application Priority Data

Apr. 25, 1997 [JP] Japan ................................. 9-108686
Feb. 27, 1998 [JP] Japan ................................. 10-047719

[51] Int. Cl.⁶ .......................... B29C 33/38; B29C 35/08; B29C 41/02
[52] U.S. Cl. .......................... 264/497; 264/219; 264/308
[58] Field of Search .................................. 264/219, 308, 264/401, 497

[56] References Cited

U.S. PATENT DOCUMENTS

| | | | |
|---|---|---|---|
| 4,247,508 | 1/1981 | Housholder | 264/219 |
| 4,863,538 | 9/1989 | Deckard | 264/497 |
| 5,089,185 | 2/1992 | Hirano et al. | 264/401 |
| 5,204,055 | 4/1993 | Sachs et al. | 419/2 |
| 5,354,414 | 10/1994 | Feygin | 216/34 |
| 5,536,467 | 7/1996 | Reichle et al. | 264/401 |
| 5,718,279 | 2/1998 | Satoh et al. | 164/456 |

FOREIGN PATENT DOCUMENTS 3-183530 8/1991 Japan.

OTHER PUBLICATIONS

U.S. Patent application Ser. No. 09/010,855 filed Jan. 22, 1998.

*Primary Examiner*—Leo B. Tentoni
*Attorney, Agent, or Firm*—Finnegan, Henderson, Farabow, Garrett & Dunner, L.L.P.

[57] ABSTRACT

A depositing step and an irradiating step are repeated alternately so as to pile solid layers to produce a laminated mold for casting an alloy melt. In the depositing step there is formed a deposited layer of sand coated with a thermosetting resin capable of forming a solid layer upon being irradiated with a laser beam. In the irradiating step, the deposited layer is irradiated with a laser beam to form a hardened solid layer. The irradiating step includes the operations of: distinguishing an outer skin portion from an inner portion of the deposited layer, and emitting a thick laser beam having a large diameter to harden the inner portion of the deposited layer, and emitting a thin laser beam having a diameter smaller than the thick laser beam to harden the skin portion of the deposited layer.

16 Claims, 11 Drawing Sheets

FIG. 6 (A)
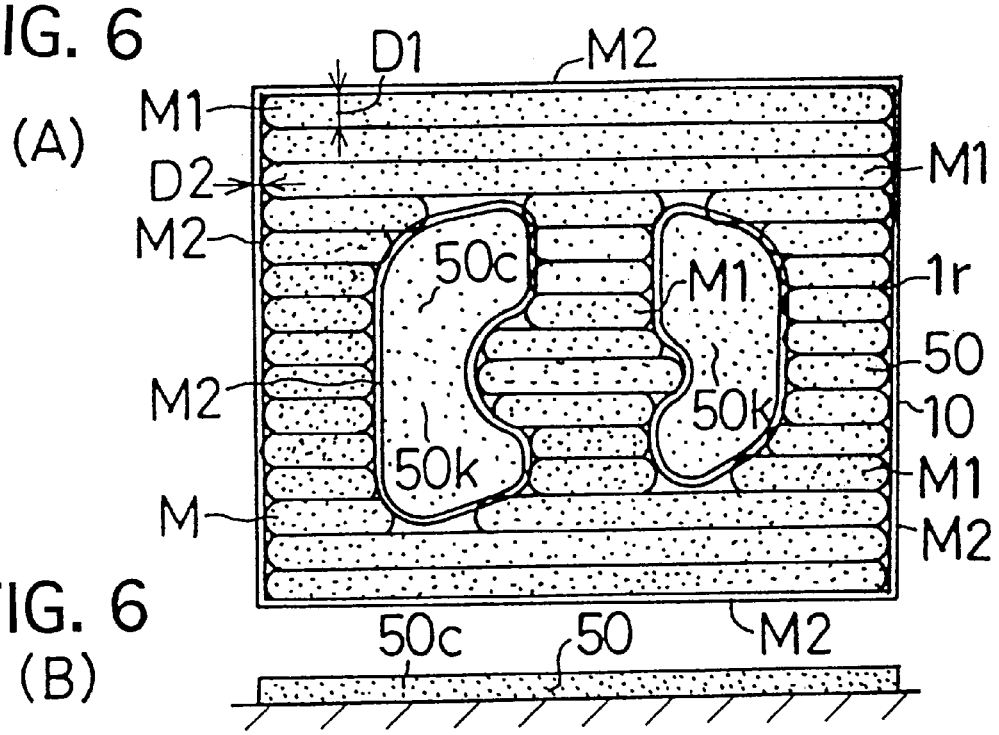
FIG. 6 (B)
FIG. 7
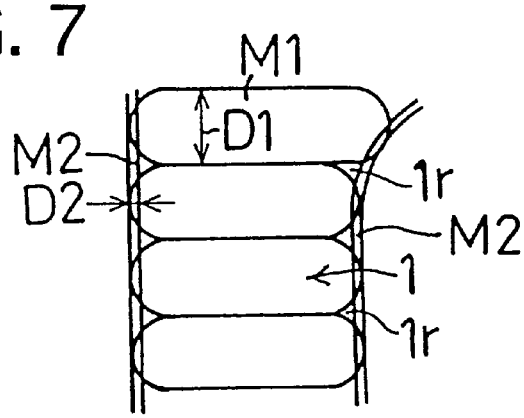
FIG. 8
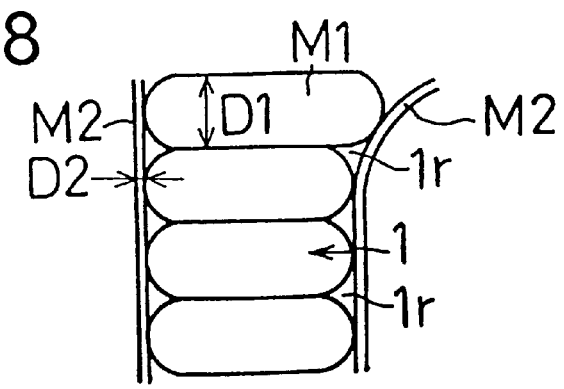

METHOD FOR PRODUCING LAMINATED OBJECT

BACKGROUND OF THE INVENTION

1. Field of the Invention

This invention relates to a method for producing a three-dimensional laminated object such as casting molds by piling solid layers formed by use of a laser beam.

2. Description of the Related Art

A technique has been developed recently for producing a three-dimensional laminated object. It is disclosed in Japanese Unexamined Patent Publication (KOKAI) No.3-183,530 and U.S. Pat. No, 4,247,508. This technique emits a laser beam to material such as resin-coated sand to form a solid layer, piling a plurality of solid layers in a thickness direction to produce the three-dimensional laminated object.

This technique emits the laser beam to the material so as to obtain a target shape, forming convex portions 101a being equivalent to a diameter of the laser beam in a skin portion 101 of the solid layer 100, as appreciated in FIG. 16. Since the diameter of the laser beam influences shape-accuracy of the skin portion 101 in such a way, the diameter is set to be small. So, this technique has a limit in increasing an irradiation area, requiring a long irradiation time for forming one solid layer, thereby generating a limit in productivity of the three-dimensional laminated object.

SUMMARY OF THE INVENTION

The present invention has been developed in view of the aforementioned circumstances. It is therefore an aim of the present invention to provide a method which is advantageous in ensuring shape-accuracy of a skin portion of a three-dimensional laminated object, and in contributing to decreasing a laser beam irradiation time to improve productivity.

In a first aspect of the present invention, the method repeats a depositing step and an irradiating step alternatively so as to pile solid layers in a thickness direction for producing a three-dimensional laminated object. In the depositing step, a material capable of forming the solid layer by receiving a laser beam is deposited to constitute a deposited layer. In the irradiating step, the deposited layer is irradiated with the laser beam to constitute the solid layer.

The irradiating step comprises the operations of:
  distinguishing a skin portion of said three-dimensional laminated object from an inner portion of the three-dimensional laminated object in a laser beam diameter;
  and emitting a thick laser beam having a large diameter for forming the inner portion of the three-dimensional laminated object, and emitting a thin laser beam having a diameter smaller than the thick laser beam for forming the skin portion of the three-dimensional laminated object.

The first aspect of the present invention emits the thick laser beam to form the inner portion of the three-dimensional laminated object, thereby decreasing the irradiation time for forming the inner portion of the three-dimensional laminated object to improve productivity.

The first aspect of the present invention emits the thin laser beam to form the skin portion of the three-dimensional laminated object, thereby ensuring shape-accuracy of the skin portion of the three-dimensional object.

The second aspect of the present invention has a common laser source for emitting both of the thick laser beam and the thin laser beam, thereby advantageously decreasing costs for laser equipment.

The third aspect of the present invention has one laser source for supplying the thick laser beam and another laser source for supplying the thin laser beam. The third aspect of the present invention may emit both of the thick laser beam and thin laser beam simultaneously; so, it is advantageous in decreasing the irradiation time. Also, the third aspect of the present invention may emit both of the thick laser beam and thin laser beam at different time.

Suitable Mode

The present invention distinguishes the skin portion of the three-dimensional laminated object from the inner portion of the three-dimensional laminated object in a beam-diameter. Terms "thick" and "thin" herein are a relative ratio in a beam-diameter. The thin laser beam is smaller than the thick laser beam in a beam-diameter. A diameter of the thin laser beam and a diameter of the thick laser beam may be selected depending on the kinds of the laser beam, the size of the three-dimensional laminated object, the kinds of the material constituting the three-dimensional laminated object, the scanning speed of the laser beam, required productivity, or the like. The diameter of the thin laser beam may be, for example, 0.01–1.0 [mm], 0.1–0.3 [mm]. The diameter of the thick laser beam may be, for example, 0.3–50 [mm], 2–10 [mm]. The diameter isn't restricted within these extents. The thick laser beam may have an enlarged diameter expanded by use of an expanding system having an expanding lens.

The present invention may have a preferable mode in which the thick laser beam and the thin laser beam are supplied by a common laser source. In this preferable mode, one laser beam supplied by the common laser source is divided into plurals beams by a beam-splitting means. The beam-splitting means may be a beam splitter, a prism, or the like. In the case of the beam splitter having a constitution formed by piling coated films, adjustment in the thickness of the coated film may generate a desired proportion in dividing the thick beam into the plural beams.

The present invention may have another preferable mode in which the thick laser beam is supplied by one laser source, and the thin laser beam is supplied by another laser source. This preferable mode allows a laser source having a larger output to emit the thick laser beam, and it allows a laser source having a smaller output to emit the thin laser beam.

The present invention may simultaneously emit the thin laser beam to portions adjoining the portions irradiated by the thick laser beam. Also, the present invention may simultaneously emit the thin laser beam to portions being distant from the portions irradiated by the thick laser beam.

In a preferable mode of the present invention, when Q1 exhibits a total energy irradiated by the thick laser beam per unit area, and when Q2 exhibits a total energy irradiated by the thin laser beam per unit area, Q1 is preferably near Q2 in view of suppressing unevenness in hardening the solid layer. Especially, Q1 is substantially equal to Q2 (Q1≈Q2).

Therefore, in the case where the thin laser beam is larger than the thick laser beam in energy density, when V1 exhibits a scanning speed of the thick laser beam and V2 exhibits a scanning speed of the thin laser beam, V1 is smaller than V2 so as to realize a relation that Q1 is substantially equal to Q2.

For example, in the case where the thick laser beam exhibits an output of 1000 [W] and a beam-diameter of 5 [mm] and where the thin laser beam exhibits an output of 50 [W] and a beam-diameter of 0.2 [mm], this case shows a relation of $(1000/5^2)<(50/0.2^2)$. The denominator of $5^2$ and $0.2^2$ means a factor about a beam-spot area. This case shows that the energy emitted by the thin laser beam per unit area is larger than the energy emitted by thick laser beam per unit area. So, this case indicates that the scanning speed V2 of the thin laser beam is set to be larger than the scanning speed V1 of the thick laser beam (V2>V1).

Depending to various conditions, a preferable mode of the present invention may indicate the following relation: V1≈V2, V1>V2

In the case where the thin laser beam is larger than the thick laser beam in energy density, this case may display that thick laser beam is increased than the thin laser beam in irradiation repetitions.

The present invention may use grains, powders, such as resin-coated sand, and liquefied resin as the material capable of forming the solid layer by receiving the laser beam. The resin may be thermosetting resin. The present invention may use well-known laser beam, such as a $CO_2$ laser beam, a YAG laser beam, a Ar laser beam, a ruby laser beam, or an excimer laser beam. The beam may be visible or invisible.

BRIEF DESCRIPTION OF THE DRAWINGS

FIG. 6(A) is a plane view showing a configuration irradiated by a thick laser beam and a thin laser beam;

FIG. 6(B) is a sectioned view showing a sand layer;

FIG. 7 is a constitutional view showing a configuration irradiated by a thick laser beam and a thin laser beam;

FIG. 8 is another constitutional view showing anther configuration irradiated by a thick laser beam and a thin laser beam;

FIG. 9(A) is a constitutional view for explaining sliced models in the three-dimensional model;

FIG. 9(B) is a sectioned view for explaining a skin layer model in the sliced model 40X in the three-dimensional model;

FIG. 9(C) is a constitutional view for explaining discontinuity between sliced models in the three-dimensional model;

FIG. 9(D) is a sectioned view for explaining a skin layer model in the sliced model 40Y in the three-dimensional model;

DESCRIPTION OF THE PREFERRED EMBODIMENTS

The preferred embodiments will hereinafter be described with reference to the accompanied drawings.

Embodiment Constitution

Figure 1:
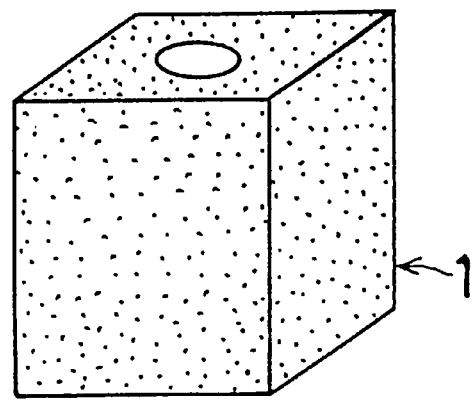
FIG. 1 is a perspective view of a three-dimensional laminated object.
Figure 2:
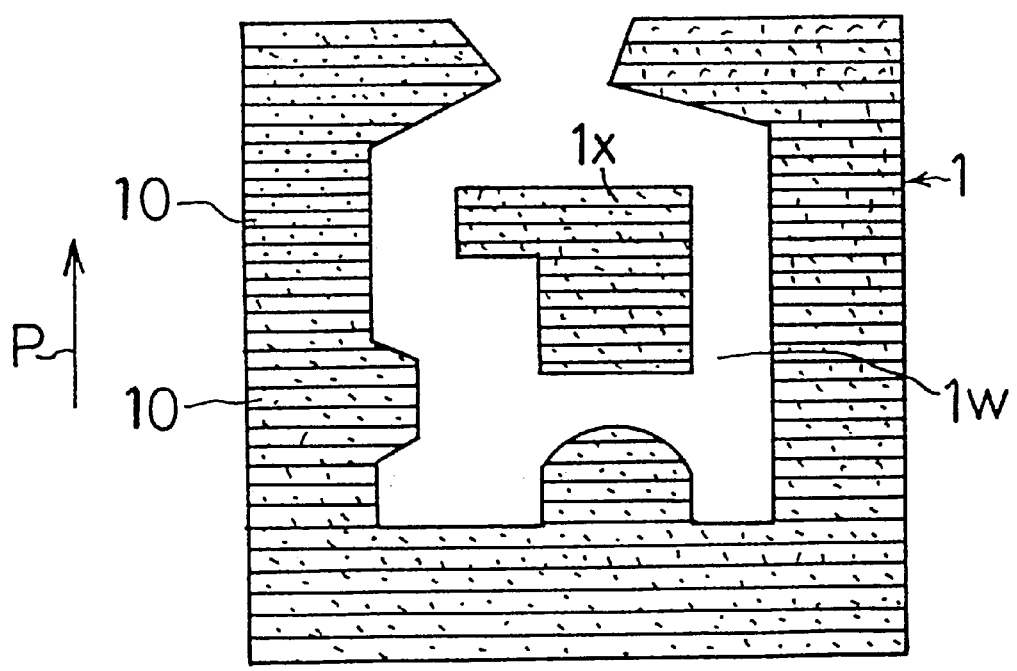
FIG. 2 is a sectioned view of the three-dimensional laminated object.

FIG. 1 shows a concept of a three-dimensional laminated object 1 produced on the basis of the preferred embodiment. FIG. 2 shows a sectioned view of the three-dimensional laminated object 1 to be produced. The three-dimensional laminated object 1 is constituted by piling a plurality of solid layers 10 (thickness: 0.1–0.3 [mm] ) in a piling direction, a direction P, thereby constituting a casting mold. The laminated object 1 has a middle mold portion 1x disposed inside, and a hollow 1w working as a forming cavity to be fulled with aluminum or ferrous alloy melt.

Figure 3:
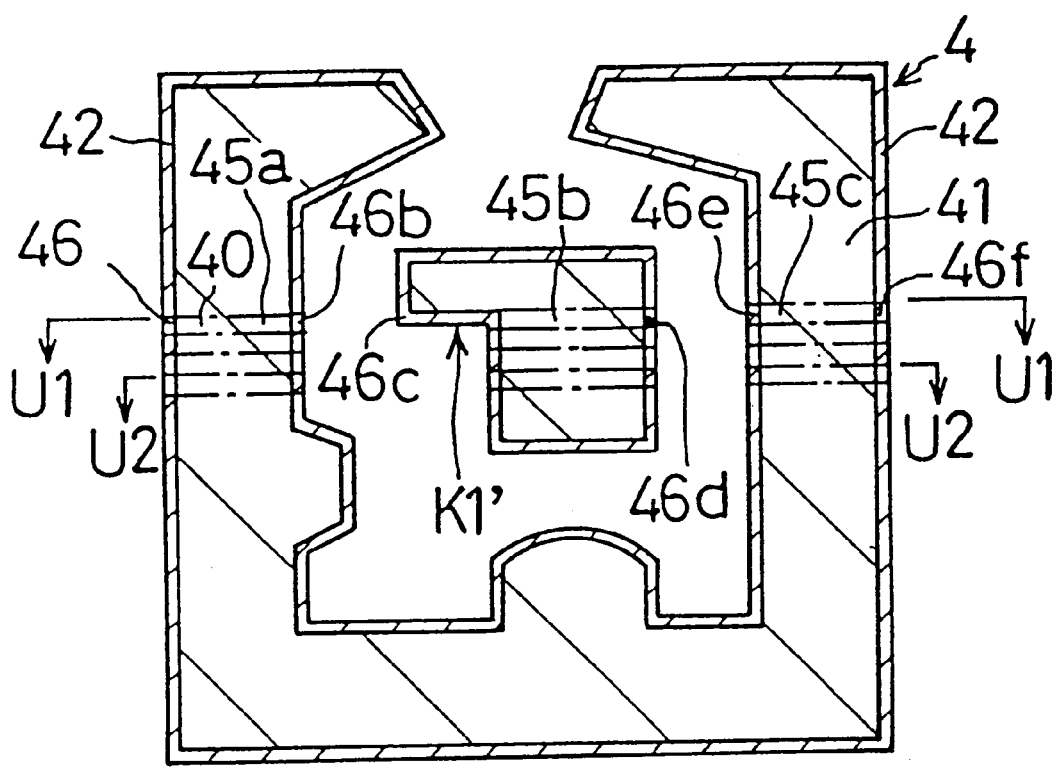
FIG. 3 is a sectioned view of a three-dimensional model.

The embodiment requires a grasp about a three-dimensional model 4 being equivalent to the laminated object 1 to actually be produced, as shown in FIG. 3. The three-dimensional model 4 is constituted by piling a plurality of thin sliced models 40, each of them is equivalent to one solid layer 10. As shown in FIG. 3, the three-dimensional model 4 is constituted from a three-dimensional basic body 41 showing a basic shape of the model 4, and a three-dimensional skin layer 42 showing only a three-dimensional contour of the model 4. A thickness of the three-dimensional skin layer 42 is selected on request in response to a size of laminated object 1, exhibiting, for example, 0.3–5 [mm] (0.6 [mm]).

Figure 4:
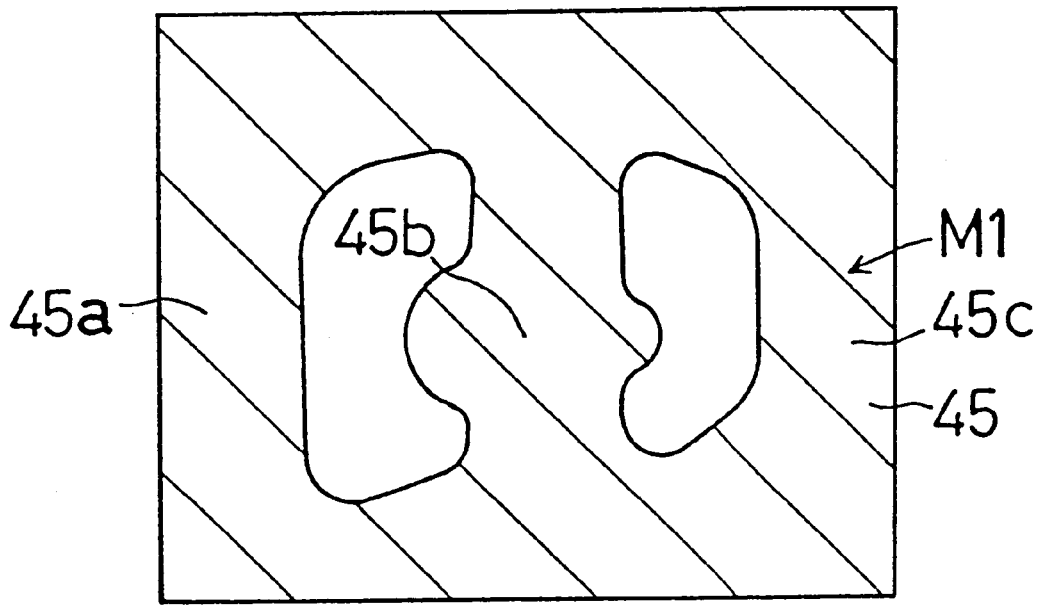
FIG. 4 is a sectioned view of a sectioned basic model.

The sliced model 40 will be described hereinafter as an example. It is sliced in the three-dimensional model 4 along the line U1—U1 in FIG. 3. FIG. 4 shows a two-dimensional basic shape of the sectioned basic model 45, as hatched. In FIG. 4, the hatched whole area 45a,45b,45c is equivalent to the irradiated area with a thick laser beam M1 having a large beam-diameter.

Figure 5:
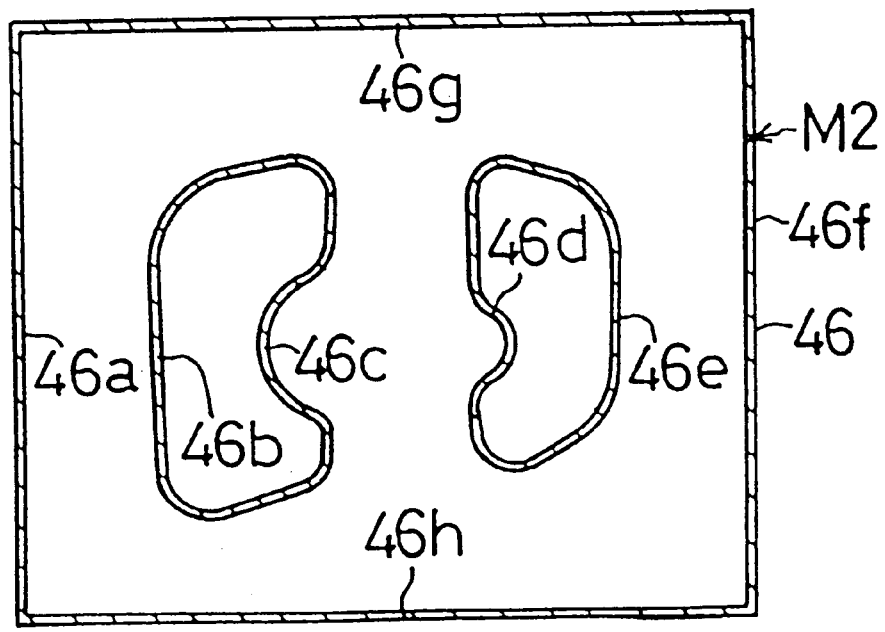
FIG. 5 is a sectioned view of a sectioned skin layer model.

FIG. 5 shows a sectioned skin layer model 46 having a two-dimensional skin shape, as hatched. In FIG. 5, the hatched skin layer 46a–46f–46h cis equivalent to the irradiated area with a thin laser beam M2 having a small beam-diameter.

In the present embodiment, as appreciated in FIG. 6(B), a sand layer 50 working as a deposited layer is formed by depositing resin-coated sand 50c on a setting surface before emitting the laser beams M1,M2.

The present embodiment calculates a scanning trace for scanning the thick laser beam M1 on the basis of the data about the sectioned basic model 45, and it calculates a scanning trace for scanning the thin laser beam M2 on the basis of the data about the sectioned skin layer model 46. The present embodiment allows the thick laser beam M1 and the thin laser beam M2 to be scanned on the sand layer 50 on the basis of the calculated scanning trace. So, FIG. 6(A) shows an irradiated configuration on the sand layer 50 irradiated with the laser beams M1,M2. In this configuration, the laser beams M1,M2 may be emitted at the same time or at different time.

Since the sand layer 50 is irradiated with the laser beams M1,M2, resin is hardened in the resin-coated sand 50c, thereby combining the adjoined resin-coated sand 50c to constitute one solid layer 10. In the sand layer 50, an area 50k which is shown in FIG. 6(A) and which is not irradiated with the laser beams M1,M2 is not hardened. So, removal of the area 50k generates a hollow for working as a forming cavity.

The above-described explanation is about the sliced model 40 disposed along line U1—U1 in FIG. 3. The similar explanation is applicable to other sliced model disposed along line U2—U2 or the like in FIG. 3

As shown in FIG. 7, the present embodiment allows partial overlaps to be generated between portions irradiated with the thick laser beam M1 having a beam diameter D1 and portions irradiated with the thin laser beam M2 having a beam diameter D2. Also, as shown in FIG. 8, the present embodiment allows overlaps not to be generated between the portions irradiated with the thick laser beam M1 having a beam diameter D1 and the portions irradiated with the thin laser beam M2 having a beam diameter D2.

As understood in FIGS. 7,8, one irradiation or few repetitions of irradiation might cause insufficiency-hardness potions 1r which are not irradiated with laser beams M1,M2. In this case, the present embodiment allows repetitions to be increased in irradiation of the laser beams M1,M2. Also, the present embodiment allows the insufficiency-hardness potions 1r to be heated by use of heating means such as hearths and flames.

In the case where the insufficiency-hardness potions 1r don't cause an impediment, the present embodiment permits the insufficiency-hardness potions 1r to remain as they are.

The present embodiment requires the grasp about the sliced model 40 having substantial two-dimension shape, after the grasp about that three-dimensional basic body 41 defining the basic shape of the three-dimensional model 4, and after the grasp about the three-dimensional skin layer 42 defining the skin portion of the three-dimensional model 4. Advantages caused by the present embodiment having such procedure will be described hereinafter.

Figure 9:
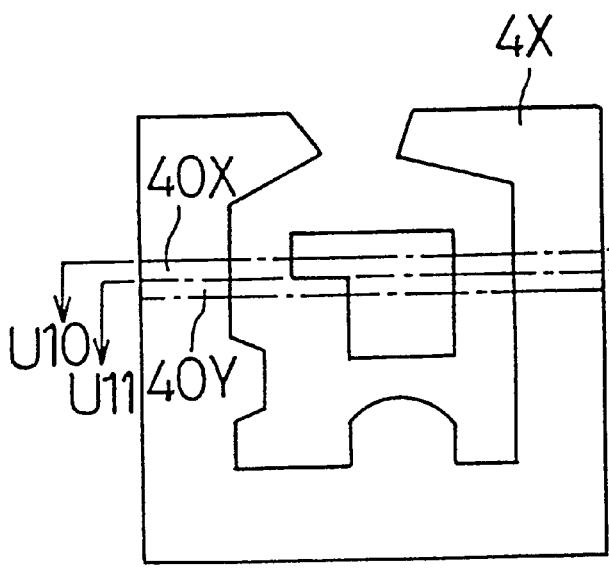
FIGS. 9(A)–(D) are constitutional views for explaining a comparable example.
Figure 9B:
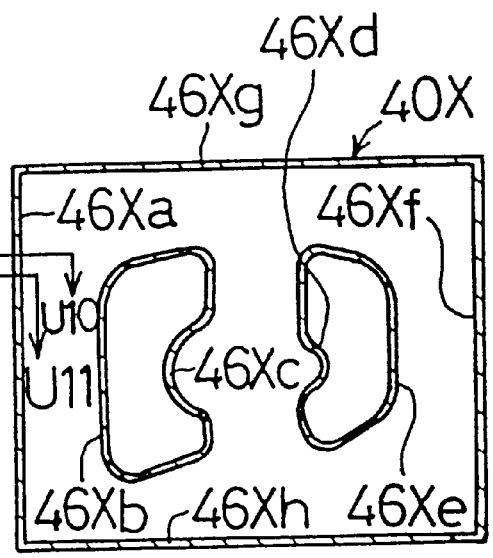
Figure 9C:
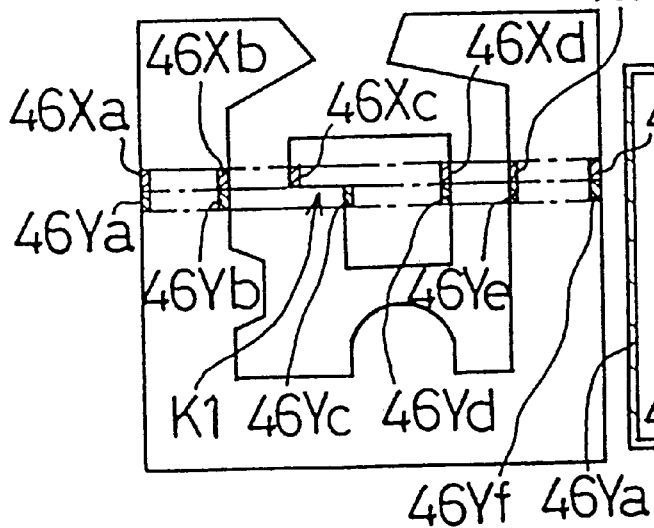
Figure 9D:
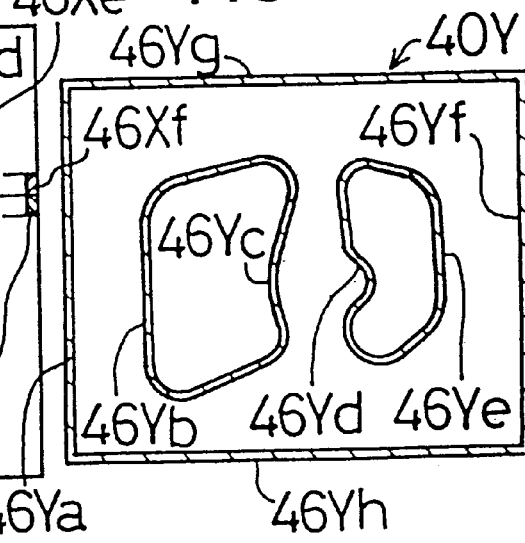

FIG. 9(A), indicating a comparable example, shows the three-dimensional model 4X being free of the above-mentioned three-dimensional skin layer 42, as distinct from FIG. 3. Also, FIG. 9(A) shows a sliced model 40X disposed along line U10—U10 and a sliced model 40Y disposed along line U11—U11. FIG. 9(B) shows a sectioned view of the sliced model 40X, and it shows the hatched skin layers 46Xa–46Xf–46Xh in the sliced model 40X. FIG. 9(D) shows a sectioned view of the sliced model 40Y disposed under the sliced model 40X, and it shows the hatched skin layers 46Ya–46Yf–46Yh in the sliced model 40Y. FIG. 9(C), indicating the comparable example, shows the layered configuration formed by piling the shape indicated in FIG. 9(B) and the shape indicated in FIG. 9(B). As appreciated in FIG. 9(C), a region indicated by an arrow K1 is suddenly and discontinuously changed in a sectioned shape of the three-dimensional laminated object. Thus, the region indicated by the arrow K1 causes a problem that discontinuity is generated between the skin layer 46Xc and the skin layer 46Yc, thereby causing imperfection in producing a three-dimensional laminated object.

On the other hand, as shown in FIG. 3, the present embodiment requires the grasp about the two-dimensional sliced model 40 after the grasp about the three-dimensional skin layer 42. So, as shown in FIG. 3, in the present embodiment obtains the skin layer being continuing at a region indicated by an arrow K1', thereby solving the above-mentioned problem that the skin layer is discontinuous, as different from FIG. 9 (C) having discontinuity.

Figure 10:
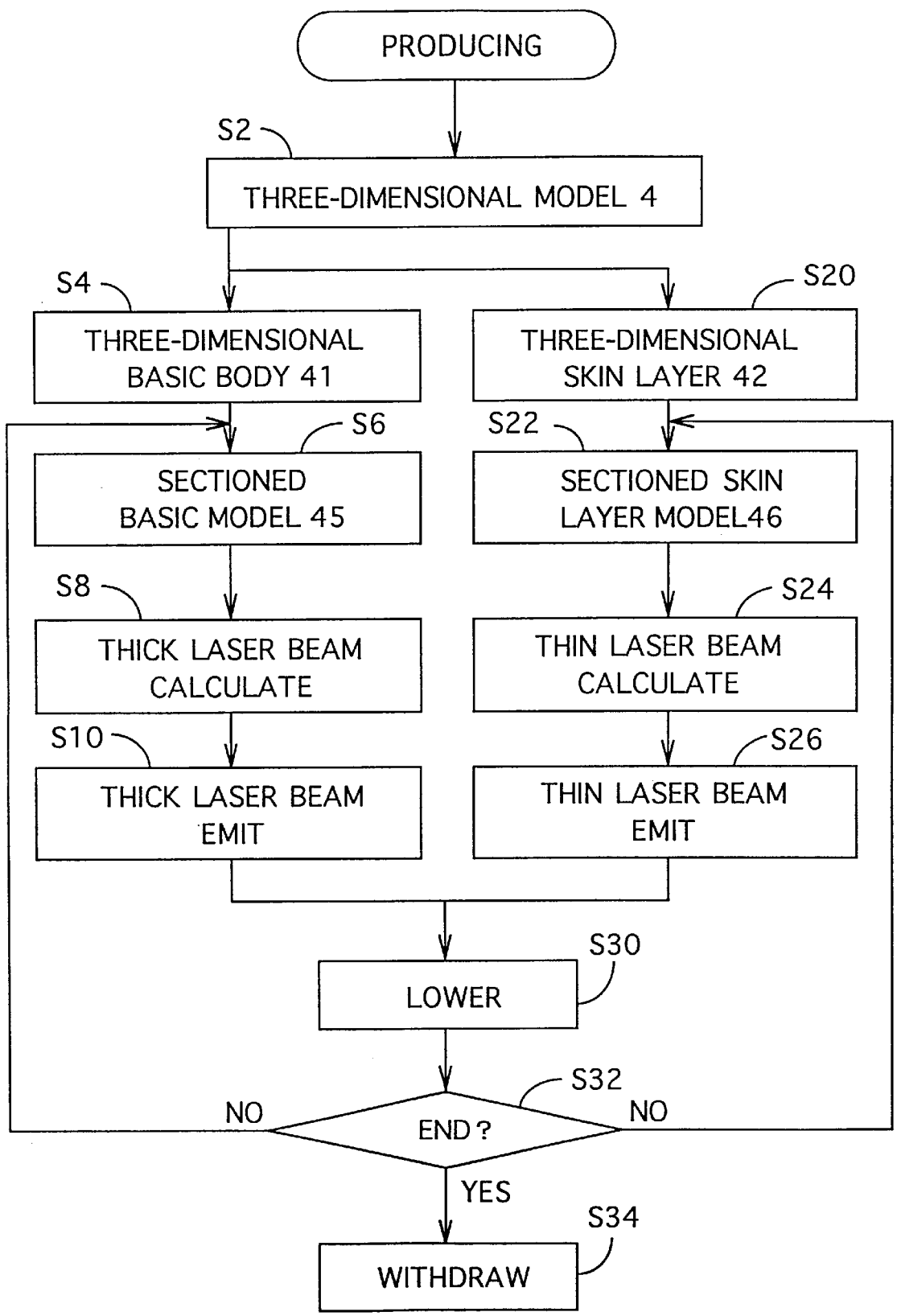
FIG. 10 is a flow chart showing an operational order.

Now, FIG. 10 shows a process in producing the three-dimensional laminated object 1. In step S2, the three—dimensional model 4 is decided for having a target shape and a target size on the basis of the three-dimensional laminated object 1 to be produced in view of elongation rate or the like. In step S4, three-dimensional basic body 41 is decided in the three-dimensional model 4. In step S6, the sectioned basic model 45 having two-dimension is decided on the basis of the three-dimensional basic body 41. In step S8, a scanning trace is calculated for the thick laser beam on the basis of sectioned basic model 45. In step S10, the thick laser beam is emitted on the basis of the scanning trace. In step S20, the three-dimensional skin layer 42 is decided in the three-dimensional model 4. In step S22, the sectioned skin layer model 46 having two-dimension is decided on the basis of the three-dimensional skin layer 42. In step S24, a scanning trace is calculated for the thin laser beam on the basis of sectioned skin layer model 46. In step S26, the thin laser beam is emitted on the basis of the scanning trace. In step S30, the solid layer 10 is lowered by a thickness of one solid layer 10. In step S32, the controller judges whether the three-dimensional laminated object 1 is finished or not. If yes, the three-dimensional laminated object 1 is withdrawn. If no, the controller returns to the steps S6,S22. The present embodiment permits the controller to carry out steps S4–S10 and steps S20–S26 simultaneously.

Embodiment Effect

The present embodiment distinguishes the skin portion from the inner portion in the laser beam diameter in producing the three-dimensional laminated object 1. Namely, the present embodiment emits the thick laser beam M1 having a large diameter for forming the inner portion of the three-dimensional laminated object 1, and emits the thin laser beam M2 having a smaller diameter for forming the skin portion of the three-dimensional laminated object 1.

In such a way, the inner portion having larger volume in the three-dimensional laminated object 1 is irradiated with the thick laser beam M1 having a larger spotting area; so, irradiation time is shortened in forming the inner portion of the three-dimensional laminated object 1, and thereby productivity is improved in producing the three-dimensional laminated object 1.

Further, since the skin layer of the three-dimensional laminated object 1 is formed by use of the thin laser beam M2, shape-accuracy is ensured in the skin portion of the three-dimensional laminated object 1.

Even when the insufficiency-hardness potions 1r are generated owing to no-irradiation of laser beams M1.M2, the insufficiency-hardness potions 1r are hardened by use of other heating means, such as hearths or flames, and thereby the three-dimensional laminated object 1 is advantageously improved in hardness.

EXAMPLE 1

Figure 11:
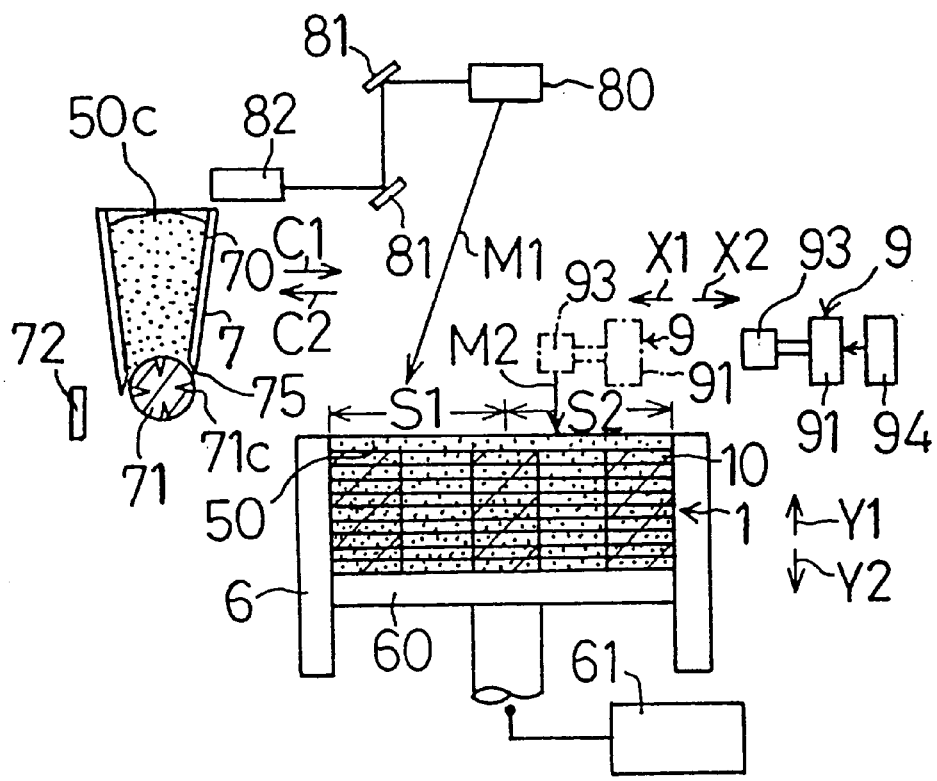
FIG. 11 is a side view showing a constitution of Example 1.
Figure 12:
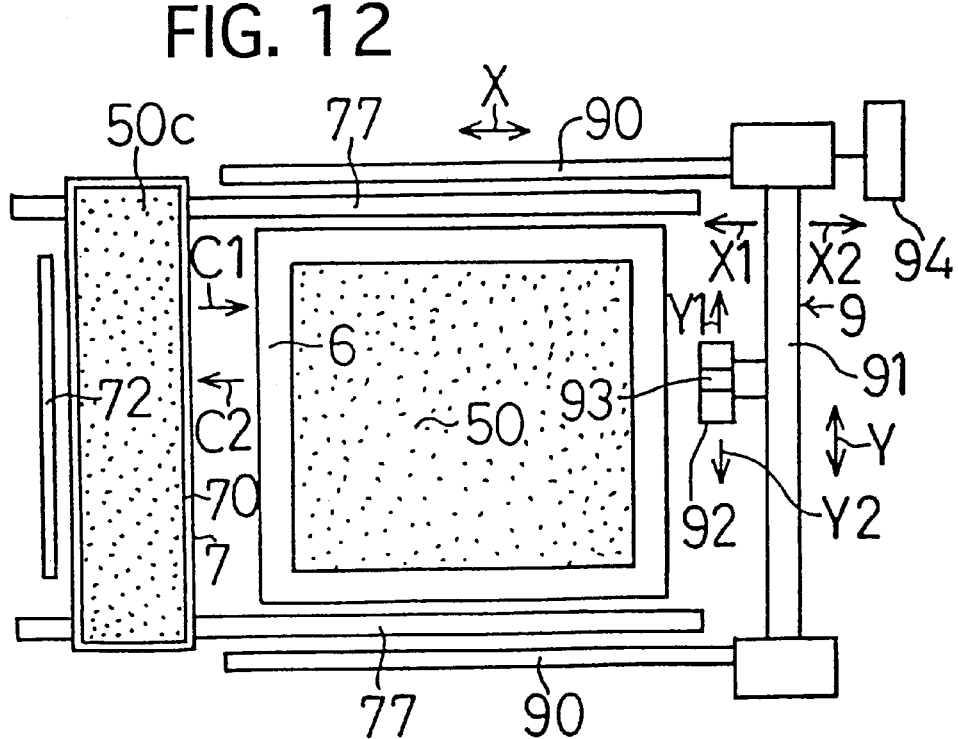
FIG. 12 is a plane view showing the constitution of Example 1.

FIGS. 11,12 show Example 1 in which a fixed frame 6 has a lift table 60 capable of rising and falling by a lift means 61 in directions Y1,Y2. A depositing apparatus 7 for depositing resin-coated sand 50c is disposed to horizontally move in a direction C1, a sand-depositing direction, and in a direction C2, a returning direction. The depositing apparatus 7 has a container 70 storing the resin-coated sand 50c, a rotatable cutting roller 71 disposed at the bottom of the container 70, and a raking plate 72 adjoining the container 70. A main emitting apparatus 80 is disposed over the fixed frame 6 for emitting a laser beam M1 having a large beam-diameter, and it has a built-in rotating mirror (not shown) for changing an emitting angle consecutively. There is disposed a laser source 82 ($CO_2$ laser, large output: 5 [kW]–10 [kW]) for emitting a thick laser beam M1 to the main emitting apparatus 80 by way of reflecting mirrors 81.

A movable XY-plotter 9 is disposed adjoining the fixed frame 6. The XY-plotter 9 includes: a X-traveling portion 91 capable of moving in directions X1,X2 along a guide rail 90 disposed in a direction X; a Y-traveling portion 92 capable of moving in directions Y1,Y2 and being equipped with the X-traveling portion 91; and a sub emitting apparatus 93 equipped with the Y-traveling portion 92. The sub emitting apparatus 93 is disposed at a lower position than the main emitting apparatus 80, and it emits the thin laser beam M2 having a small beam-diameter. There is disposed a sub laser source 94 ($CO_2$ laser, small output: 50 [W]–100 [W]) for emitting the laser beam to the sub emitting apparatus 93. The XY-plotter 9 moves the sub emitting apparatus 93 two-dimensionally in the directions X,Y, and it is advantageous in emitting the laser beam to a wide area without distortion as distinct from a system having a rotating mirror.

First, the depositing apparatus 7 is moved along the guide rail 77 in the direction C1, while rotating the cutting roller 71. So, the depositing apparatus 7 discharges the resin-coated sand 50c outwardly from an outlet 75 of the container 70 by grooves 71c of the cutting roller 71, thereby depositing the resin-coated sand 50c on the upper surface of the lift table 60 to form a sand layer 50 having a thickness of 0.1–0.3 [mm]. The raking plate 72 is moved with the container 70 in the same direction, levelling an upper surface of the sand layer 50. Thereafter, the depositing apparatus 7 returns in the direction C2, finishing the depositing step.

Next, the main emitting apparatus 80 emits the thick laser beam M1 having a large beam-diameter to a designated area of the sand layer 50, carrying out the first irradiation operation. Also, while the XY-plotter 9 moves in the directions X,Y, the sub emitting apparatus 93 emits the thin laser beam M2 having a small beam-diameter to another designated area of the sand layer 50, carrying out the second irradiation operation, thereby finishing the irradiating step.

Example 1, at the same time, may carry out the first irradiation operation for emitting the thick laser beam M1 and the second irradiation operation for emitting the thin laser beam M2. If the XY-plotter 9 interrupts the laser beam M1, Example 1 may carry out the first irradiation operation and the second irradiation operation at different time. Example 1 may carry out the first irradiation operation to the region S1 by use of the main emitting apparatus 80, while carrying out the second irradiation operation to the region S2 by use of the sub emitting apparatus 93, and thereafter it may replace each other.

The above-described steps, the depositing step, the irradiating step using the laser beams M1,M2, harden the sand layer 50 to form the solid layer 10. Repetitions of the depositing step and the irradiating step allows the solid layer 10 to be piled gradually to produce the three-dimensional laminated object 1.

EXAMPLE 2

Figure 13:
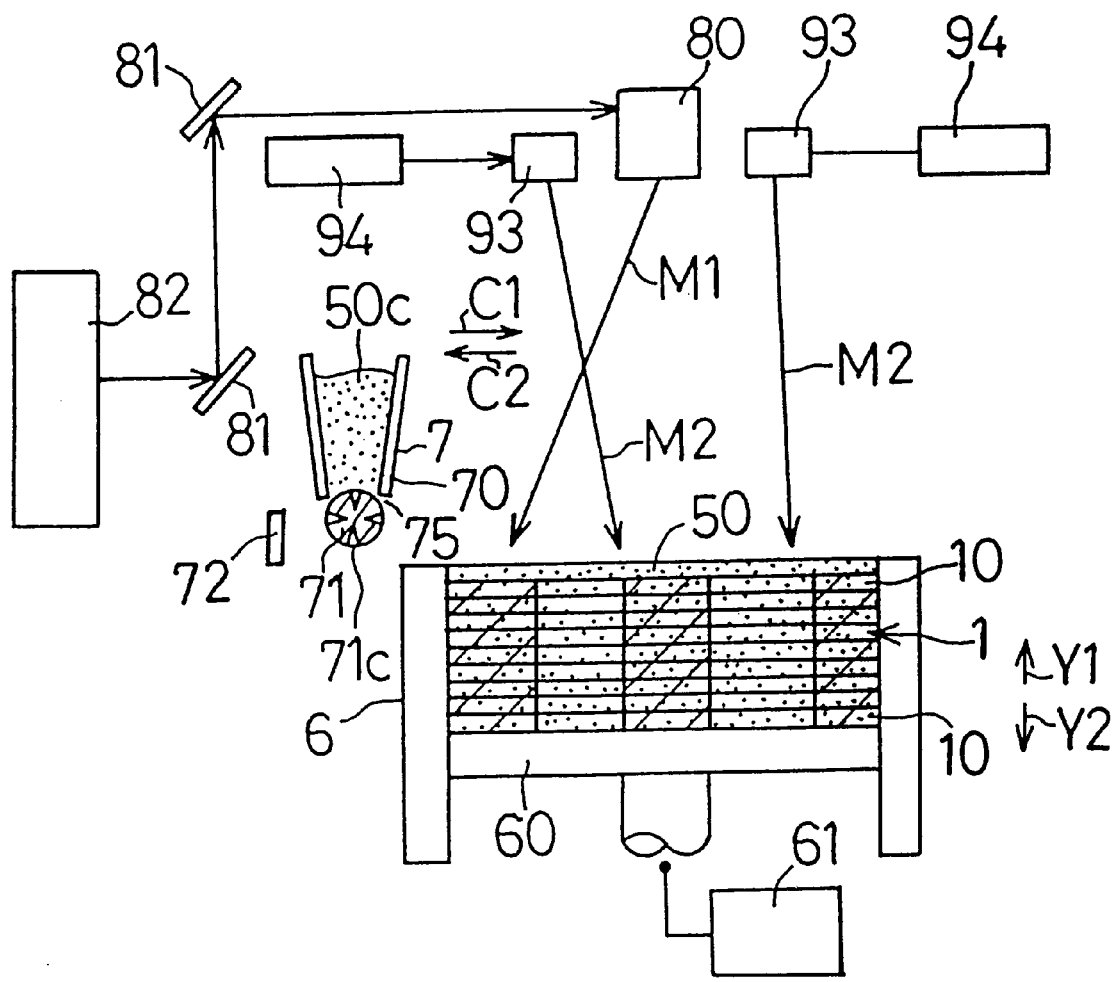
FIG. 13 is a side view showing a constitution of Example 2.

FIG. 13 shows Example 2 in which a fixed frame 6 has a lift table 60 capable of rising and falling by a lift means 61 in directions Y1,Y2. A depositing apparatus 7 for depositing resin-coated sand 50c is disposed to horizontally move in a direction C1, a sand-depositing direction, and in a direction C2, a returning direction. A main emitting apparatus 80 is disposed over the fixed frame 6 for scan. There is disposed a main laser source 82 ($CO_2$ laser, large output: 1000 [W], beam-diameter: 5 [mm]) for emitting a thick laser beam M1 to the main emitting apparatus 80 by way of reflecting mirrors 81.

A plurality of the sub emitting apparatuses 93 are disposed over the fixed frame 6. There are disposed a plurality of the sub laser sources 94 ($CO_2$ laser, small output: 50 [W], beam-diameter: 0.2 [mm]) for emitting the thin laser beam to the sub emitting apparatus 93.

Example 2 may carry out the first irradiation operation for emitting the thick laser beam M1 to a designated region of the sand layer 50 by use of the main emitting apparatus 80. Also, it may carry out the second irradiation operation for emitting the thin laser beam M2 to another designated region of the sand layer 50 by use of the sub emitting apparatuses 93. In this case, the thin laser beam is larger than the thick laser beam in the scanning speed.

Example 2, being free of the movable XY-plotter, avoids interference of the laser beam and the XY-plotter so as to carry out the first irradiation operation and the second irradiation operation simultaneously. If necessary, Example 2 may carry out the first irradiation operation and the second irradiation operation at different time.

Example 2, having a plurality of sub emitting apparatuses 93, permits the thin laser beam to be set at a plurality of beam-diameter. Namely, in Example 2, one of the sub emitting apparatuses 93 may emit the thin laser beam to a skin portion of the laminated object, and another of sub emitting apparatuses 93 may emit a superthin laser beam to an superficial skin portion of the laminated object.

EXAMPLE 3

Figure 14:
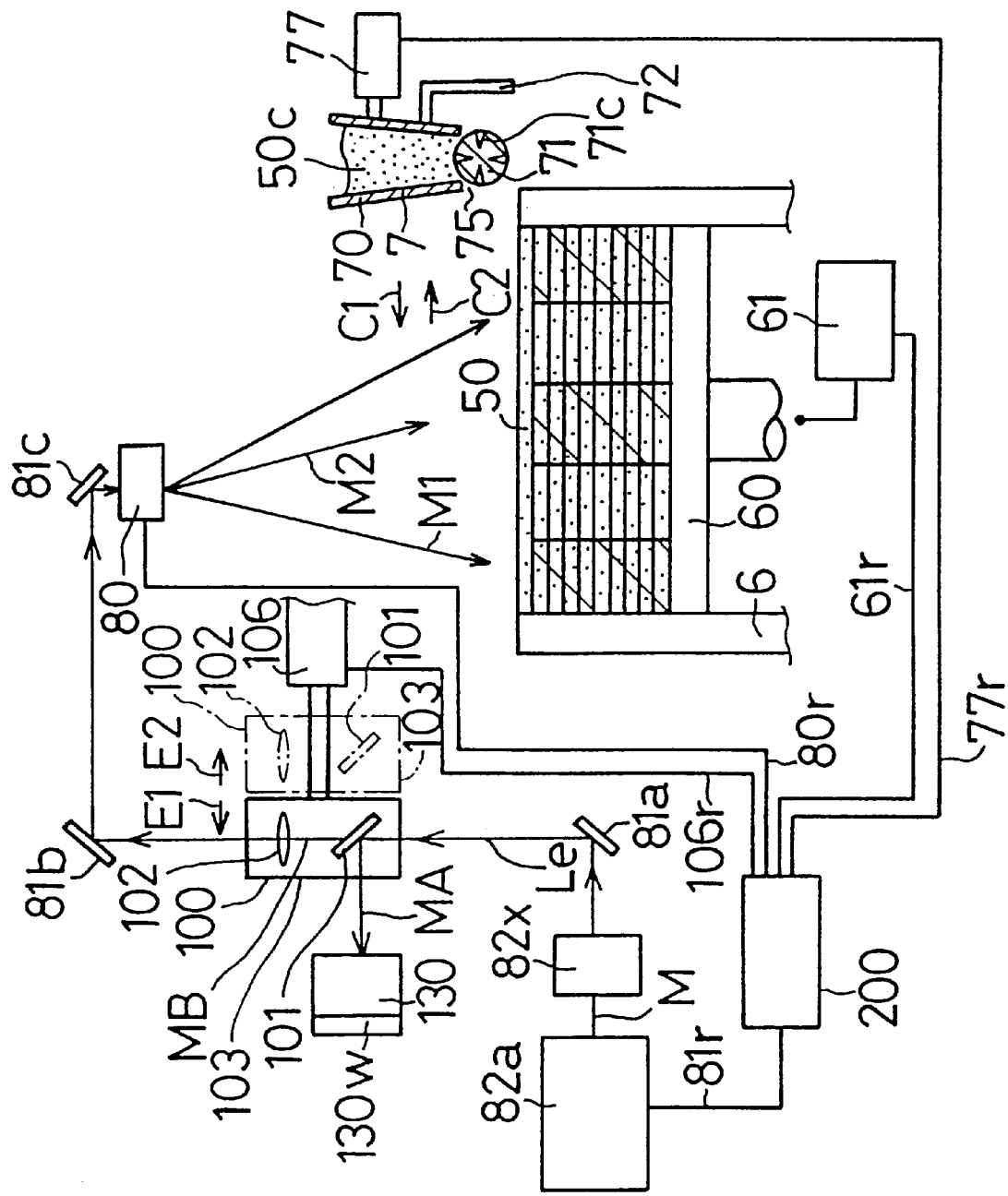
FIG. 14 is a side view showing a constitution of Example 3.

FIG. 14 shows Example 3 in which one common main source 82a emits both the thick laser beam and the thin laser beam at different time. In Example 3, a fixed frame 6 has a lift table 60 capable of rising and falling by a lift means 61 such as cylinder machinery or motor machinery. A depositing apparatus 7 for depositing resin-coated sand 50c is disposed to move in a direction C1, a sand-depositing direction, and in a direction C2, a returning direction. The depositing apparatus 7 has a container 70 storing the resin-coated sand 50c, a rotatable cutting roller 71 disposed at the bottom of the container 70, a raking plate 72 adjoining the container 70, and a driving source 77 for moving the container 70 in the directions C1,C2. The driving source 77 is constituted by use of cylinder machinery or motor machinery.

A main emitting apparatus 80 is disposed over the fixed frame 6 for emitting a thick laser beam M1 having large beam-diameter, and it has a built-in rotating mirror (not shown) for changing an emitting angle consecutively. There is disposed one common laser source 82a ($CO_2$ laser, large output: 5 [kW]–10 [kW]) for emitting a laser beam to the main emitting apparatus 80 by way of reflecting mirrors 81a–81c. A beam-splitting means 100, being movable, is disposed between the laser source 82a and the main emitting apparatus 80. The beam-splitting means 100 has a beam-splitter 101 constituted by a half-mirror, a beam-diameter adjusting lens 102, and a hosing 103. The beam-diameter adjusting lens 102 has a function capable of adjusting a beam-diameter in the range of 5–0.2 [mm]. The driving source 106 moves the beam-splitting means 100 in the directions E1,E2 to set and withdraw the beam-splitting means 100 with respect to a laser beam course Le. A beam-absorbing implement 130, for having a cooling portion 130w, is disposed near the beam-splitting means 100. The beam-absorbing implement 130 is constituted by covering an absorbing coat to a metallic body such as an aluminum body, having a function for absorbing a laser beam. The absorbing coat may be formed from alumite, graphite, and manganous phosphate, or the like.

A controller 200 controls the laser source 82a by way of a signal line 81r, the driving source 106 by way of a signal line 106r, the main emitting apparatus 80 by way of a signal line 80r, the driving source 77 by way of a signal line 77r, and the lift means 61 by way of a signal line 61r.

In Example 3, the depositing apparatus 7 is moved along the guide rail 77 in the direction C1, while rotating the cutting roller 71. So, the depositing apparatus 7 discharges the resin-coated sand 50c outwardly from an outlet 75 by grooves 71c of the cutting roller 71, thereby depositing the resin-coated sand 50c on an upper surface of the lift table 60 to form a sand layer 50. The raking plate 72 is moved with the container 70 in the same direction, levelling an upper surface of the sand layer 50. After such deposition, the depositing apparatus 7 returns in the direction C2, finishing the depositing step.

In Example 3, firstly, in order to obtain the thin laser beam M2, the driving source 106 drives the beam-splitting means 100 in the direction E1 to set it at the laser beam course Le. When the laser beam M is emitted from the laser source 82a, the laser beam M reaches the beam-splitter 101 of the beam-splitting means 100 by way of the beam-adjuster 82x and the reflecting mirror 81a. So, the laser beam M is divided into two laser beams MA,MB. The divided laser beam MA is absorbed by the beam-absorbing implement 130. The divided laser beam MB is adjusted in beam-diameter by the beam-diameter adjusting lens 102, reaching the main emitting apparatus 80 by way of the reflecting mirrors 81b,81c. So, the main emitting apparatus 80 emits the thin laser beam M2 having a small diameter to a designated region in the sand layer 50.

After emitting the thin laser beam M2, the main emitting apparatus 80 emits the thick laser beam M1 having a large diameter. For such a case, the driving source 106 inversely drives the beam-splitting means 100 in the direction E2 to withdraw it from the laser beam course Le. The laser beam M emitted from the laser source 82a reaches the main emitting apparatus 80 by way of the reflecting mirrors 81a, 81b, 81c. So, the main emitting apparatus 80 emits the thick laser beam M1 having a laser beam-diameter to another designated region in the sand layer 50. In such a case, since the beam-splitting means 100 escapes from the laser beam course Le, the laser beam doesn't pass through the beam-splitting means 100.

In other words, Example 3 displays the following steps (A)–(E).
(A) the sand-depositing step
(B) the step in which the thin laser beam M2 is emitted to the skin layer of the laminated object as a scanning irradiation.
(C) the step in which the beam-splitting means 100 escapes from the laser beam course Le.
(D) the step in which the thick laser beam Ml is emitted in the inner part of the laminated object.
(E) the step in which the beam-splitting means 100 is set at the laser beam course Le.

The above-described steps, the depositing step, the irradiating step using the laser beams M1,M2, harden the sand layer 50 to form the solid layer 10. Repetitions of the depositing step and the irradiating step allows the solid layer 10 to be piled gradually to produce the three-dimensional laminated object 1.

Emitting of the thick laser beam, for instance having a beam-diameter of 5 [mm], requires that the laser source 82a exhibits a large output power. Emitting of the thin laser beam, for instance having a beam-diameter of 0.2 [mm], requires that the laser source 82a exhibits a small output power.

Although the laser source having a large output power, when it is used at a small output power, the laser source is sometimes unstable in operation thereof, depending on kinds of the laser source. For example, although a laser source has an output power of 1000 [W] and a beam-diameter of 5 [mm], when output power of the laser source is decreased to an output power of 50 [W], an output ratio of 1/20, the laser source sometimes shows unstability in oscillation. Also, in this case, the beam-diameter is to be reduced at 0.2 [mm] from 5 [mm], a beam-diameter ratio of 1/25.

In emitting the thin laser beam, Example 3 allows the laser beam to pass the beam-splitting means 100 without decreasing the output power of the laser source 82a. As a result, Example 3 permits the thin laser beam to be securely generated, while keeping the laser source 82a stable in oscillation.

EXAMPLE 4

Figure 15:
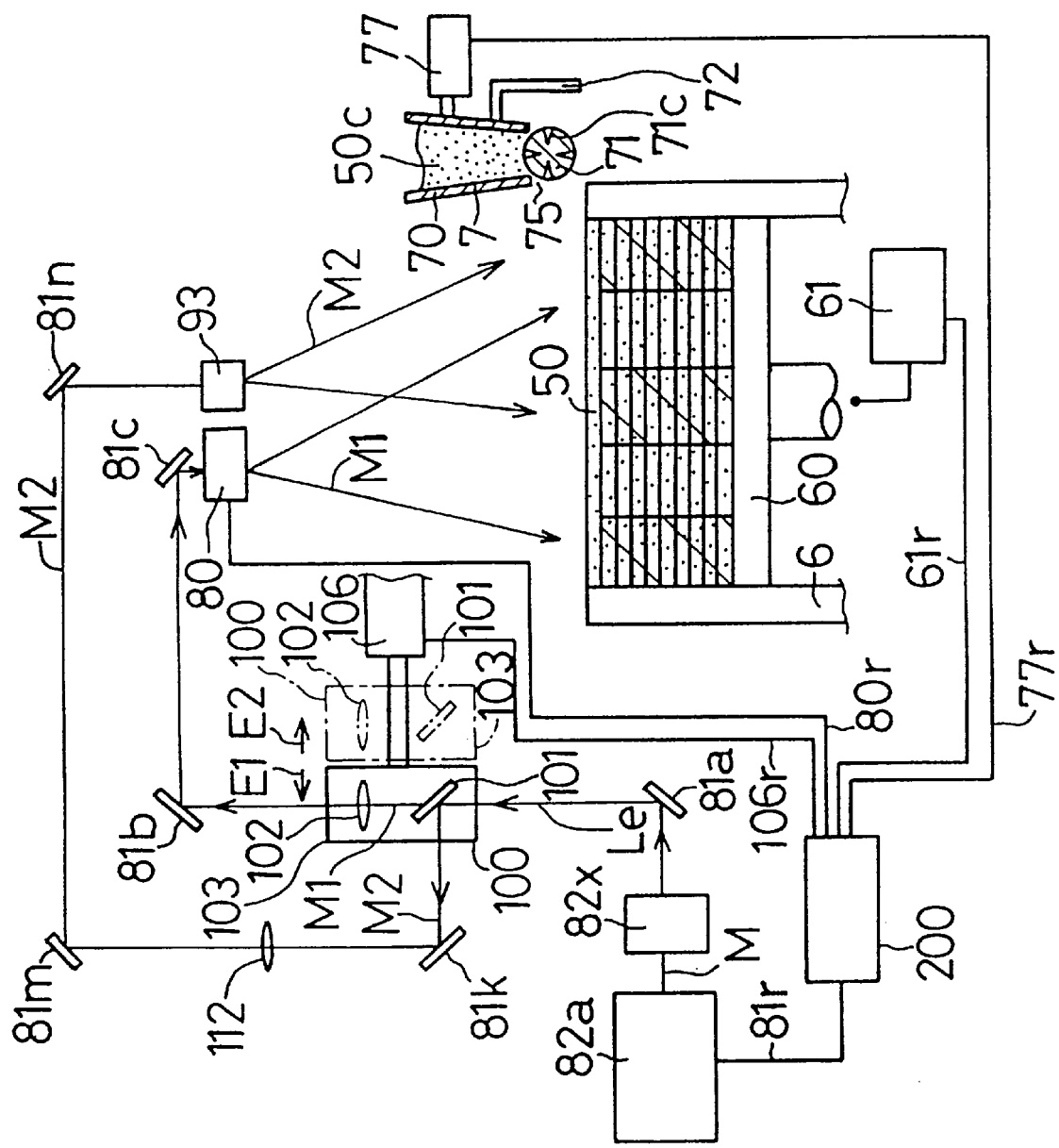
FIG. 15 is a side view showing a constitution of Example 4.
Figure 16:
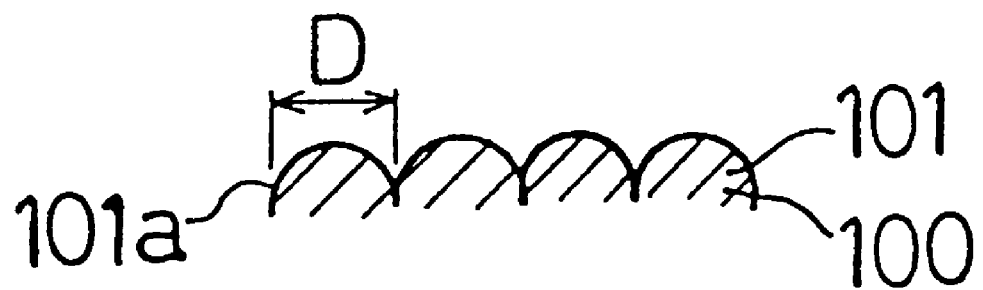
FIG. 16 is a constitutional view showing convex portions of a skin portion in a three-dimensional laminated object.

FIG. 15 shows Example 4 in which a thin laser beam and a thick laser beam, divided from one laser beam, are simultaneously emitted by use of one common laser source 82a. Example 4 is the same as Example 3 shown in FIG. 14 in a constitution. In Example 4, the driving source 106 drives the beam-splitting means 100 in the direction E1 to set it at the laser beam course Le. Laser beam M emitted from the laser source 82a reaches the beam—splitter 101 of the beam-splitting means 100 by way of the beam-adjuster 82x and the reflecting mirror 81a. So, the laser beam M is divided into two laser beams, the thick laser beam M1 and the thin laser beam M2. The energy-dividing ratio may be as follows:

thick laser beam M1: thin laser beam=(9:1)–(7:3)

The divided thick laser beam M1 is adjusted by the beam-diameter adjusting lens 102, reaching the main emitting apparatus 80 by way of the reflecting mirrors 81b,81c. Thus, the thick laser beam M1 is emitted to a designated region of the sand layer 50. The divided thin laser beam M2 is reflected by the reflecting mirror 81k, and is adjusted by the beam-diameter adjusting lens 112, reaching the sub emitting apparatus 93 by way of the reflecting mirrors 81m,81n. So, the sub emitting apparatus 93 emits the thin laser beam M2 to another designated region in the sand layer 50. In this way, Example 4 divides the laser beam M emitted from the common laser source 82a into the thick laser beam M1 and the thin laser beam M2 by the beam-splitting means 100, thereby using the thick laser beam M1 and the thin laser beam M2 simultaneously. Therefore, Example 4 is advantageous in using the laser beam without abandoning the remainder of the laser beam.

Other Examples

Each of the above-described Examples has one beam-splitter 101; however, other Example may have a plurality of beam-splitters 101 to greatly decrease a beam-diameter of the laser beam. This generates the thin laser beam effectively with stability of the laser source 82a.

What is claimed is:
1. A method for producing a casting mold having a forming cavity to be filled with alloy melt, comprising the steps of:
repeating a depositing step and an irradiating step alternately so as to pile solid layers in a thickness direction to form said mold, said depositing step including depositing a sand coated with a thermosetting resin capable of forming said solid layer by receiving a laser beam to form a deposited layer, said irradiating step including irradiating said deposited layer with said laser beam to form a hardened solid layer, wherein said irradiating step further includes the operations of:

distinguishing an outer skin portion of said deposited layer from an inner portion of said deposited layer; and emitting a thick laser beam having a large diameter to harden said inner portion of said deposited layer, and emitting a thin laser beam having a diameter smaller than said thick laser beam to harden said skin portion of said deposited layer.

2. The method according to claim 1, wherein said thin laser beam has a diameter of 0.01–1.0 mm, and said thick laser beam has a diameter of 0.3–5.0 mm.

3. The method according to claim 1, wherein said thin laser beam has an energy density larger than that of said thick laser beam.

4. The method according to claim 1, wherein when Q1 represents a total energy irradiated by said thick laser beam per unit area, when Q2 represents a total energy irradiated by said thin laser beam per unit area, Q1 is substantially equal to Q2.

5. The method according to claim 1, wherein a scanning speed of said thin laser beam is larger than a scanning speed of said thick laser beam.

6. The method according to claim 1, wherein said thick laser beam and said thin laser beam are emitted in such a manner that said solid layer has partial overlaps generated between portions irradiated with said thick laser beam and portions irradiated with said thin laser beam.

7. The method according to claim 1, wherein said thick laser beam and said thin laser beam are emitted in such a manner that said solid layer is free of partial overlaps between portions irradiated with said thick laser beam and portions irradiated with said thin laser beam.

8. The method according to claim 1, wherein said thick laser beam and said thin laser beam are supplied by a common laser source.

9. The method according to claim 8, wherein a beam-splitting means is disposed at a laser beam course through which one laser beam is supplied from said common laser source, and said beam-splitting means is capable of being set and withdrawn with respect to said laser beam course;

wherein said thin laser beam is generated by dividing said one laser beam supplied from said common laser source into a plurality of beams by use of said beam-splitting means being set at said laser beam course;

and wherein said thick laser beam is generated by withdrawing said beam-splitting means from said laser beam course.

10. The method according to claim 8, wherein a beam-splitting means is disposed at a laser beam course through which one laser beam is supplied from said common laser source, and said beam-splitting means is capable of being set and withdrawn with respect to said laser beam course;

wherein said one laser beam supplied from said common laser source is divided into said thin laser beam and the remainder laser beam by use of said beam-splitting means being set at said laser beam course.

11. The method according to claim 10, wherein said remainder laser beam is supplied into a laser-absorbing means to be absorbed.

12. The method according to claim 1, wherein said thick laser beam is supplied by use of one laser source, and said thin laser beam is supplied by use of another laser source.

13. The method according to claim 12, wherein said one laser source is a main laser source having a large output power, and said another laser source is a sub laser source having a smaller output power than said main laser source.

14. The method according to claim 13, wherein said thick laser beam is emitted by a main emitting apparatus optically connected to said main laser source, and said thin laser beam is emitted by a sub emitting apparatus optically connected to said sub laser source.

15. The method according to claim 14, wherein said sub emitting apparatus is disposed on a plotter capable of moving two-dimensionally along said deposited layer.

16. The method according to claim 1, wherein a portion of said deposited layer not irradiated with a laser beam is not hardened and is removed from said casting mold to generate said forming cavity.

* * * * *

UNITED STATES PATENT AND TRADEMARK OFFICE
CERTIFICATE OF CORRECTION

PATENT NO.: 5,985,204

DATED: November 16, 1999

INVENTOR(S): Yukio OTSUKA et al.

It is certified that an error appears in the above-identified patent and that said Letters Patent is hereby corrected as shown below:

Assignee, front page, line 1 - "Kasiha" should be --Kaisha--.

Signed and Sealed this

First Day of August, 2000

Attest:

Q. TODD DICKINSON

*Attesting Officer*     *Director of Patents and Trademarks*